(12) United States Patent
Itagaki et al.

(10) Patent No.: US 7,160,193 B2
(45) Date of Patent: Jan. 9, 2007

(54) CONSTANT VELOCITY UNIVERSAL JOINT

(75) Inventors: Taku Itagaki, Shizuoka-ken (JP);
Tatsuro Sugiyama, Shizuoka-ken (JP);
Tatsuhiro Goto, Shizuoka-ken (JP);
Shintaro Suzuki, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 112 days.

(21) Appl. No.: 10/860,634

(22) Filed: Jun. 4, 2004

(65) Prior Publication Data

US 2005/0014565 A1  Jan. 20, 2005

(30) Foreign Application Priority Data

Jun. 16, 2003  (JP) .............. 2003-170869

(51) Int. Cl.
*F16D 3/205* (2006.01)
(52) U.S. Cl. ...................... 464/111; 464/905
(58) Field of Classification Search ........... 464/111, 464/905
See application file for complete search history.

(56) References Cited

U.S. PATENT DOCUMENTS 6,478,682 B1 * 11/2002 Kura et al. .............. 464/111
2002/0028711 A1   3/2002 Ishiguro et al.
2002/0119894 A1   8/2002 Yoshida
2003/0073501 A1   4/2003 Goto et al.

FOREIGN PATENT DOCUMENTS

| EP | 1 108 910 A1 | 6/2001 |
| EP | 1 484 521 A1 | 12/2004 |
| GB | 2 285 490 A | 7/1995 |
| JP | 2000-320563 | 11/2000 |

OTHER PUBLICATIONS

Universal Joint and Driveshaft Design manual, AE No. 7, Society of Automotive Engineers, Inc., Warrendale, PA, p. 139, TJ1079.S62 1979.*

* cited by examiner

*Primary Examiner*—Greg Binda
(74) *Attorney, Agent, or Firm*—Arent Fox PLLC

(57) ABSTRACT

In a no-flange type outer joint member, the amount of abrasion in a large inner diameter portion formed for a track groove is intended to be restrained. In a tripod type constant velocity universal joint including: a no-flange type outer joint member; and a roller assembly including a roller, being attached to a trunnion so as to be capable of oscillating, hardened layers are formed on portions of a large inner diameter portion of the outer joint member, which are in contact with an inclined roller assembly. In this case, a value of F/D is set equal to or less than 0.45, where a distance from a center of the track groove of the outer joint member to the ends of both the hardened layers on the side of the center of the track groove is F, and a diameter of an outer circumference of the roller assembly is D.

5 Claims, 4 Drawing Sheets

CONSTANT VELOCITY UNIVERSAL JOINT

BACKGROUND OF THE INVENTION

1. Field of the Invention

The present invention relates to a constant velocity universal joint, in particular, to a sliding type tripod constant velocity universal joint.

2. Description of the Related Art

Generally, a constant velocity universal joint is a kind of universal joint, which couples a driving shaft and a driven shaft with each other and allows the transmission of torque at a constant velocity even if an angle is formed between the two shafts (not aligned straight). Among the constant velocity universal joints, a sliding type enables relative axial displacement between two shafts by plunging a joint. As one kind of the sliding type constant velocity universal joint, a tripod type constant velocity universal joint is widely known. The tripod constant velocity universal joint is configured so that a tripod member having three trunnions protruding in a radial direction is connected to one of the shafts whereas a hollow cylindrical outer joint member having three track grooves extending in an axial direction is connected to the other shaft. The trunnions of the tripod member are housed within the respective track grooves of the outer joint member so as to transmit a torque.

In the existing tripod type constant velocity universal joint, a roller is rotatably fitted onto a cylindrical outer circumferential face of each of the three trunnions of the tripod member, which protrudes in the radial direction of the tripod member, through a plurality of needle bearings. The roller rolls on roller guiding faces of the track groove. The position of the roller with respect to the trunnion is fixed (in a coaxial state). Therefore, when torque is transmitted while the joint forms a working angle, the roller and the roller guiding faces diagonally cross each other. As a result, a slide occurs between the roller guiding faces and the roller to generate a slide resistance, which in turn generates an induced thrust in the axial direction. Such a slide resistance and an induced thrust cause the vibration and noise of a vehicle body, affecting noise, vibration, harshness (NVH) performance of the vehicle to decrease the freedom of design of the underbody of a vehicle. Therefore, it is desirable to lower the slide resistance and the induced thrust as much as possible.

A tripod type constant velocity universal joint disclosed in Japanese Patent Laid-Open Publication No. 2000-320563 has been proposed as a sliding type tripod constant velocity universal joint which intends to lower such slide resistance and induced thrust. The disclosed joint includes: rollers inserted into track grooves of an outer joint member; and rings fitted onto trunnions of a tripod member so as to rotatably support the rollers. An inner circumferential face of each of the rings is formed to have a circular-convex cross section. At the same time, an outer circumferential face of the trunnion is formed to have a straight shape on a longitudinal section and, on its cross section, is in contact with the inner circumferential face of the ring in a direction perpendicularly crossing an axial line of the joint with gaps formed between the inner circumferential face of the ring and the outer circumferential face of the trunnions in the axial direction of the joint.

In the invention of the above-cited patent publication, a roller assembly including the ring and the roller is capable of oscillating with respect to the trunnion. Therefore, when the joint forms a working angle, the trunnion can be inclined with respect to the outer joint member without changing the position of the roller assembly. Accordingly, since the position of the roller assembly becomes constantly stable so that the roller is kept parallel to the roller guiding faces, the roller can smoothly roll. Such a structure can contribute to reduction of the slide resistance, and in turn, to reduction of the induced thrust.

In the constant velocity universal joint described in the above-mentioned patent publication, as shown in FIG. 5, an outer circumferential face of a roller 34 is formed in a convex-curved shape having an arc with a center of curvature on a center axis of a trunnion 22 or at the position separate from the center axis of the trunnion 22 in a radial direction as a generatrix in view of the functions.

Outer joint members, which can be used as an outer joint member 10 in the tripod type constant velocity universal joint described in the above-mentioned patent publication, can be roughly classified into two types as shown in FIGS. 6(A) and 6(B); an outer joint member having flanges 17 in a track groove 12 on the outer diameter side of roller guiding faces 14 (FIG. 6(A)), and an outer joint member having a cylindrical large inner diameter portion 15, omitting the flanges (FIG. 6(B)). In the no-flange type (FIG. 6(B)), in particular, when the joint turns with no load such as in the case where a vehicle runs only by an inertia force, a roller 34 shifts from its normal position (in a state where the roller is kept parallel to the roller guiding faces) to be likely to be inclined because of the relation with the outer circumferential shape of the roller, as shown in FIG. 5 (the inclination herein means that the center axis of the roller is inclined on a plane containing the center axis of the joint; this meaning is also applied to the following description).

In the case where such inclination occurs, a part of the roller assembly, for example, an end face 34b of the roller 34 on the outer diameter side may sometimes be in contact with the large inner diameter portion 15 between the roller guiding faces 14. If the joint turns in such a state, sliding friction occurs at an interfered portion, which may sometimes increase the amount of abrasion of the large inner diameter portion 15.

SUMMARY OF THE INVENTION

In view of the above problem, the present invention has an object of restraining the amount of abrasion of a large inner diameter portion formed in a track groove in a no-flange type outer joint member.

In order to achieve the above object, a constant velocity universal joint according to the present invention comprises: an outer joint member having track grooves formed at three positions on its inner circumference, each of the track grooves having roller guiding faces provided so as to face each other in a circumferential direction and a large inner diameter portion provided between the roller guiding faces; a tripod member having three trunnions protruding in a radial direction; and roller assemblies attached to the respective trunnions of the tripod member, each of the roller assemblies being capable of oscillating with respect to each of the trunnions and having a roller guided in an axial direction of the outer joint member along the roller guiding faces, wherein a hardened layer is formed at least on a contact portion of the large inner diameter portion with the inclined roller assembly.

Since the hardened layer is formed on the contact portion of the large inner diameter portion with the inclined roller assembly as described above, the abrasion of the large inner diameter potion due to a slide against the roller assembly can be reduced even when the roller assembly is inclined, thereby contributing to a prolonged lifetime of the constant velocity universal joint. The hardened layers are normally formed on both ends of the large inner diameter portion in the circumferential direction. In addition, the hardened layers can also be formed on the roller guiding faces. As a result, the abrasion of the roller guiding faces due to rolling movement of the roller can also be restrained.

It is desirable that the hardened layer on the large inner diameter portion be formed at a position that satisfies F/D being equal to or less than 0.45, where a distance from the center of the track groove to an end of the hardened layer on the side of the center of the track groove is F and a diameter of the outer circumference of the roller assembly is D.

Herein, F/D indicates the boundary of the hardened layer formed on the large inner diameter portion on the side of the center of the track groove. As a value of F/D decreases, the boundary moves toward the center of the track groove. When F/D≦0.45 is established, it is ensured that the hardened layers are formed on the contact portions of the large inner diameter portion with the inclined roller assembly.

The minimum value of F/D is not particularly limited in view of the restriction of abrasion of the large inner diameter portion. For example, a value of F/D can be set to 0 so that two hardened layers provided on the large inner diameter portion are continuously formed in the circumferential direction. However, since a part of the large inner diameter portion in the vicinity of the center of the track groove is never in contact with the roller assembly, thermal treatment cost will be disadvantageously increased if the hardened layers are formed on such non-contact portions. Therefore, in consideration of economy, it is desirable to set F/D to 0.15 or larger (F/D≧0.15).

The roller assembly includes: the roller; and a ring fitted onto the trunnion so as to rotatably support the roller. Any structure can be used for the ring and the roller as long as they are relatively rotatable; the ring and the roller may be fitted on their cylindrical faces so as to enable slide contact, or rolling elements such as needle bearings may be interposed between the ring and the roller. In any cases, the ring and the roller are formed as a unit in an inseparable manner by using a washer or the like.

An outer circumferential face of the trunnion has a straight shape on its longitudinal section. On the cross section, the outer circumferential face of the trunnion is in contact with an inner circumferential face of the ring in a direction perpendicularly crossing an axial line of the joint and forms a gap between the inner circumferential face of the ring in an axial direction of the joint and itself. Owing to such a structure, the roller assembly can freely oscillate with respect to the trunnion. At the same time, since a contact ellipse between the outer circumferential face of the trunnion and the ring changes from oblong to become closer to a point, a frictional moment making the roller assembly incline is decreased. Therefore, since the position of the roller assembly becomes constantly stable so as to keep the roller parallel to the roller guiding faces, the roller can smoothly roll.

For the cross-sectional shape of the trunnion, the shape in contact with the inner circumferential face of the ring in a direction perpendicularly crossing the axial line of the joint while forming the gap with the inner circumferential face of the ring in the axial direction of the joint is such that, in other words, the faces of the trunnion, which face each other in the axial direction of the tripod member, recede in a mutual direction, that is, from a virtual cylindrical face to the minor diameter side. As a specific example thereof, an ellipse can be given. The ellipse herein is not limited to the literal ellipse, but includes shapes generally referred to as an egg shape, an oval, and the like.

The roller assembly is interposed between the trunnion and the outer joint member so as to serve to transmit a torque. Since a transmission direction of a torque always perpendicularly crosses the axial line of the joint in this type of constant velocity universal joint, the torque can be transmitted if only the trunnion and the ring are in contact with each other in the transmission direction of the torque. Accordingly, the gaps between the trunnion and the ring in the axial direction of the joint do not bring about any inconveniences in torque transmission.

DETAILED DESCRIPTION OF THE PREFERRED EMBODIMENTS

Figure 1A:
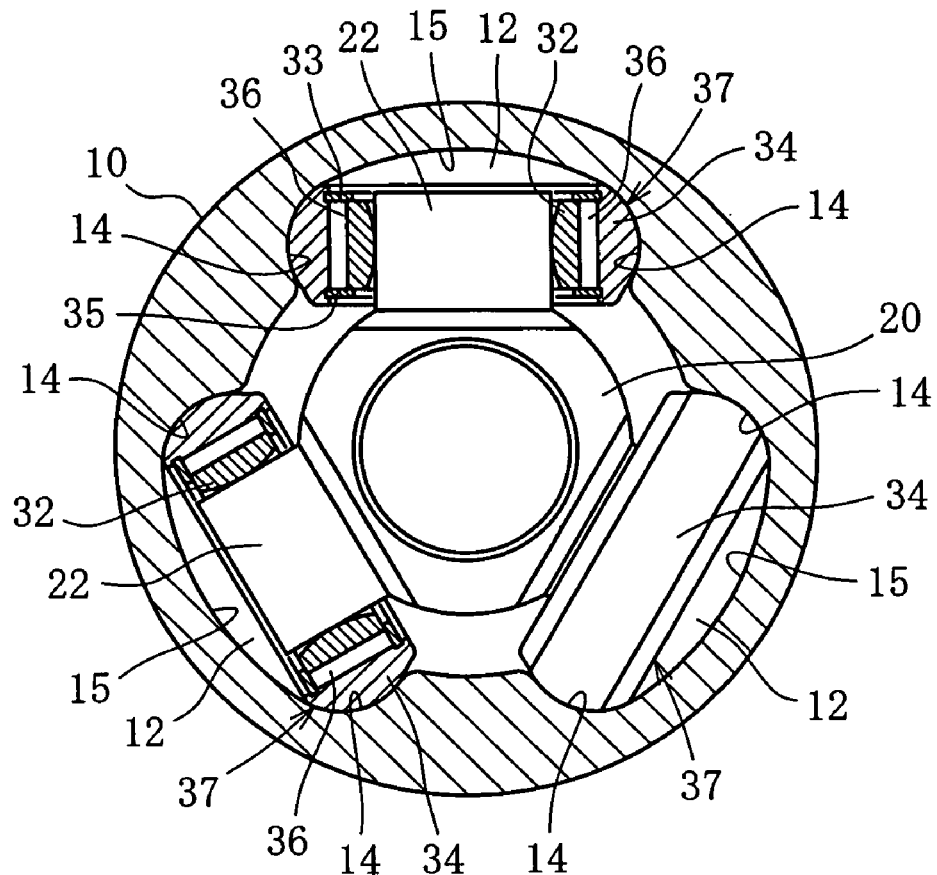
FIG. 1(A) is a cross-sectional view showing a constant velocity universal joint according to the present invention.
Figure 1B:
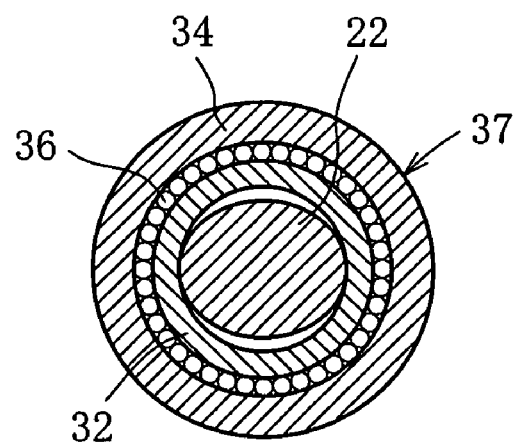
FIG. 1(B) is a cross-sectional view showing a trunnion and a roller assembly, cut along a direction perpendicularly crossing the trunnion.

Hereinafter, preferred embodiments of a constant velocity universal joint according to the present invention will be described. FIG. 1(A) is a cross-sectional view showing a joint, and FIG. 1(B) is a cross-sectional view perpendicular to a trunnion. As shown in FIGS. 1(A) and 1(B), a constant velocity universal joint is composed of an outer joint member 10 and a tripod member 20. One of two shafts to be coupled is connected to the outer joint member 10, whereas the other shaft is connected to the tripod member 20.

The outer joint member 10 has three track grooves 12 extending in an axial direction on its inner circumferential face. Roller guiding faces 14 are formed on lateral walls of each of the track grooves 12, which face each other in a circumferential direction. The tripod member 20 has three trunnions 22 provided so as to protrude in a radial direction. A roller 34 is attached to each of the trunnions 22. The roller 34 is housed within each of the track grooves 12 of the outer joint member 10.

Figure 6A:
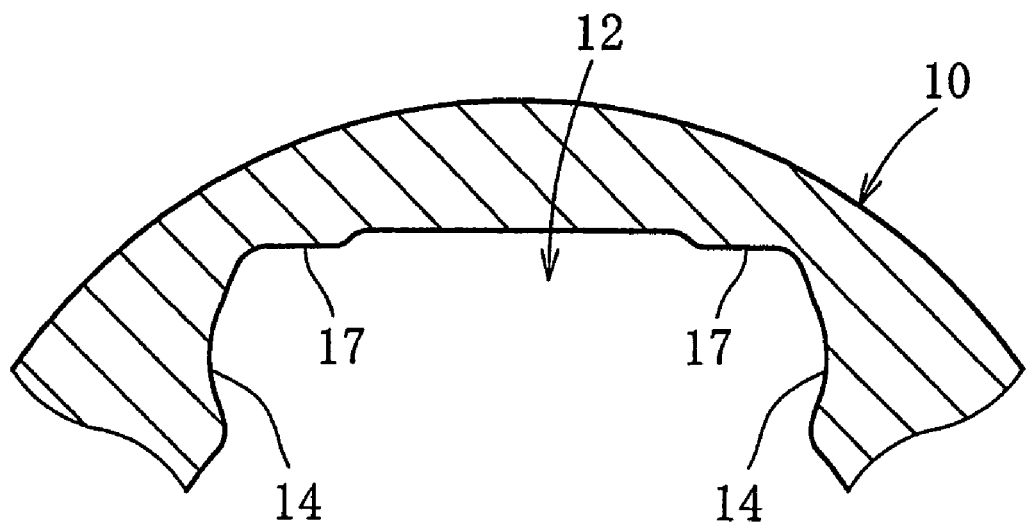
FIG. 6(A) is a cross-sectional view of a flange type outer joint member.
Figure 6B:
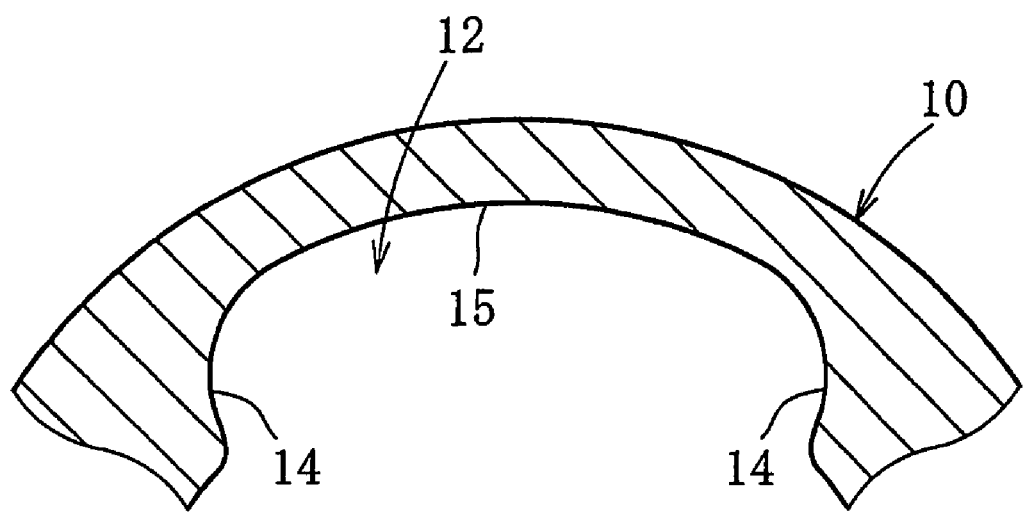
FIG. 6(B) is a cross-sectional view of a no-flange type outer joint member.

The outer joint member 10 in the present invention is so-called no-flange type, without any flanges that face an end face of the roller 34 on the outer diameter side (see FIG. 6(B)). More specifically, on the outer diameter side of each of the track grooves 12 of the outer joint member 10, a large inner diameter portion 15 is formed so as to form a cylindrical face sharing the center with the joint. Both ends of the large inner diameter portion 15 in the circumferential direction are smoothly continuous with the roller guiding faces 14 adjacent thereto.

In this embodiment, the outer circumferential face of the roller 34 is a convex curve having an arc with a center of curvature at the position separate from the axis of the trunnion 22 in the radial direction as a generatrix. A cross-section of each of the roller guiding faces 14 has a Gothic arch-like shape so that the roller 34 and the roller guiding face 14 form an angular contact. Even when the roller guiding face 14 has a tapered cross-sectional shape, the angular contact between the roller 34 and the roller guiding face 14 is realized. In this manner, by using a structure in which the roller 34 and the roller guiding face 14 form the angular contact, the roller 34 hardly swings to stabilize its position. If the angular contact is not used, for example, the roller guiding face 14 may be formed by a part of a cylindrical face having an axial line parallel-to that of the outer joint member 10 so as to have an arc-like cross-sectional shape corresponding to a generatrix of the outer circumferential face of the roller 34. Alternatively, the outer circumferential face of the roller 34 can be formed as a spherical face having a center of curvature on the axial line of the trunnion 22.

A ring 32 is fitted onto the outer circumferential face of each of the trunnions 22. The ring 32 and the roller 34 are formed as a unit through a plurality of needle bearings 36 to constitute a relatively rotatable roller assembly 37. More specifically, the plurality of needle bearings 36 are rollably interposed between an inner track surface and an outer track surface, where the inner track surface corresponds to a cylindrical outer circumferential face of the ring 32 and the outer track surface corresponds to a cylindrical inner circumferential face of the roller 34. As shown in FIG. 1(B), the needle bearings 36 are provided as many as possible without using any cages, so as to realize a so-called full complement bearing. The reference numerals 33 and 35 denote a pair of washers fitted into annular grooves formed on the inner circumferential face of the roller 34 so as to prevent the needle bearings 36 from coming off.

The outer circumferential face of the trunnion 22 has a straight shape parallel to the axial line of the trunnion 22 in FIG. 1(A), while having an elliptical shape with a longitudinal axis perpendicularly crossing the axis line of the joint in FIG. 1(B). The trunnion 22 is formed to have an approximately elliptical cross-sectional shape with a reduced thickness viewed in the axial direction of the tripod member 20. In other words, the cross-sectional shape of the trunnion 22 is such that its faces facing each other in the axial direction of the tripod member recede in a mutual direction, that is, toward the minor diameter side from a virtual cylindrical face.

The inner circumferential face of the ring 32 has a circular convex cross section. More specifically, the cross section of the inner circumferential face of the ring 32 is a convex arc with a generatrix of the inner circumferential face having a constant radius. Predetermined gaps are provided between the trunnion 22 and the ring 32 because of the circular convex cross section of the inner circumferential face of the ring 32 and the approximate elliptical cross-sectional shape of the trunnion 22 as described above. Accordingly, the ring 32 is not only movable in the axial direction of the trunnion 22 but also is capable of freely oscillating with respect to the trunnion 22. Moreover, since the ring 32 and the roller 34 are formed through the needle bearings 36 as a unit so as to be relatively rotatable as described above, the ring 32 and the roller 34 forming the roller assembly 37 are capable of oscillating with respect to the trunnion 22. Herein, the oscillation means that the axial lines of the ring 32 and the roller 34 are inclined with respect to the axial line of the trunnion 22 in a plane containing the axial line of the trunnion 22.

Among the above-described components, the outer joint member 10 first goes through a molding process such as cold forging, and then, is transferred to a thermal treatment process so as to be subjected to a thermal treatment. In this process, hardened layers formed by the thermal treatment are formed on the roller guiding faces 14 of the track groove 12 and on both ends of the large inner diameter portion 15 in a circumferential direction, that is, contact portions between the large inner diameter portion 15 and an end face of the inclined roller 34 on the outer diameter side, as indicated in hatched regions in FIG. 2 (the former layers are denoted by the reference numeral 41a, and the latter layers are denoted by the reference numeral 41b). Induction quenching is suitable as the thermal treatment because it allows local heating and free selection of a depth of the hardened layer. Moreover, with the induction quenching, since a part other than the hardened layers is little thermally affected, the performance of a base material can be kept.

When a torque is transmitted while the joint forms a working angle in the above-described structure, the trunnion 22 oscillates to-and-fro with respect to the ring 32 within the range of the working angle. At this time, the center axis of the roller assembly 37 is in a direction perpendicularly crossing the center of the joint (in the radial direction) in a normal state regardless of the position of the trunnion 22. In no-load turn or the like, however, the center axis of the roller assembly 37 is shifted from its proper direction to be inclined forward or backward (in the direction of the center axis of the joint) in some cases. In such a case, for example, the end face of the roller 34 of the inclined roller assembly 37 on the outer diameter side is brought into contact with a part of the large inner diameter portion 15 of the track groove 12. However, since the hardened layers 41 are formed on the contact portions as described above, the amount of abrasion of the outer joint member 10 at the contact portions can be reduced, thereby improving a lifetime of the joint.

Figure 2:
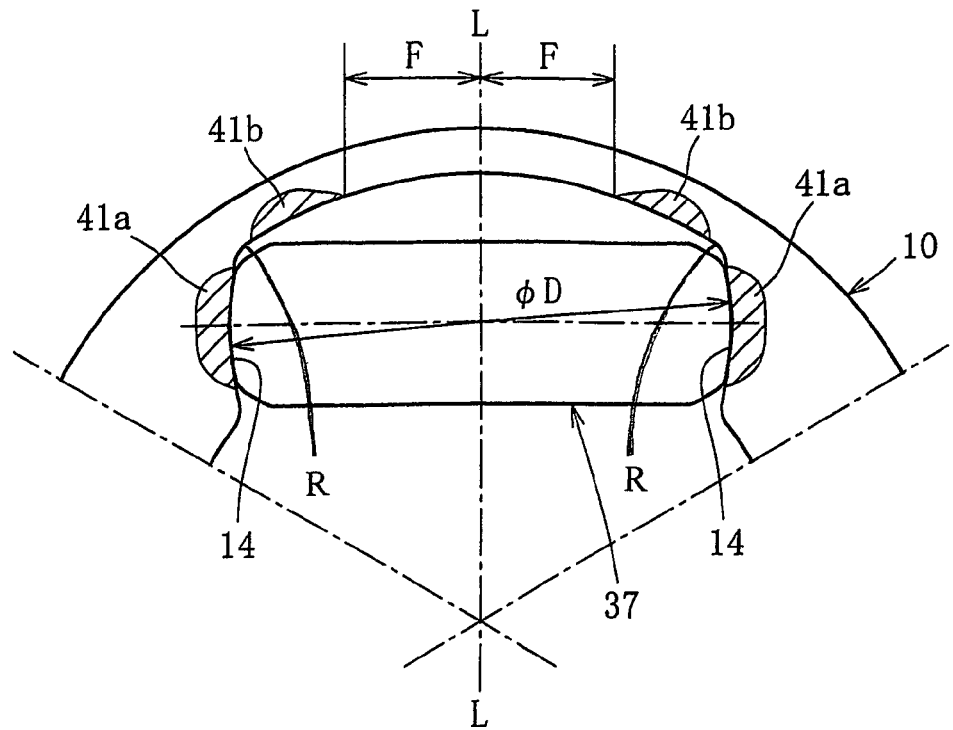
FIG. 2 is a cross-sectional view showing an outer joint member, illustrating an embodiment according to the present invention.

A value of F/D shown in FIG. 2 is set at 0.45 or less (F/D≦0.45) so as to ensure that the hardened layers 41b are present on the entire contact portions of the large inner diameter portion 15 with the inclined roller assembly 37. Herein, F is a distance from a center L of the track groove 12 to an end of a surface of each of the hardened layers 41b on the side of the center L of the track groove 12, and D is a diameter of the outer circumference of the roller assembly 37 (in this embodiment, corresponding to the maximum diameter of the outer circumference of the roller 34).

If F/D is too small, the hardened layers 41 are also formed on portions which are never in contact with the inclined roller assembly 37 (on the large inner diameter portion 15 on the side of the center of the track groove 12) to disadvantageously increase thermal treatment cost. Accordingly, it is desirable to set the value of F/D to 0.15 or larger (F/D≧0.15).

Figure 3:
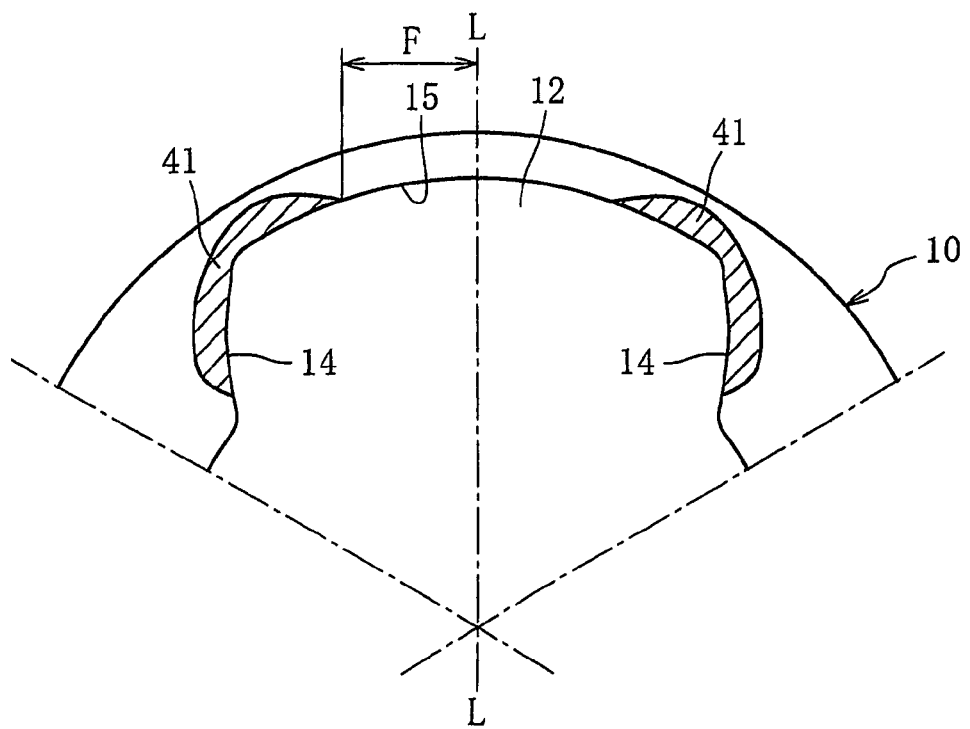
FIG. 3 is a cross-sectional view showing an outer joint member, illustrating another embodiment according to the present invention.

An R-portion or round portion connecting the roller guiding face 14 and the large inner diameter portion 15 is generally hard to perform induction quenching. From such a point of view, in the embodiment shown in FIG. 2, the hardened layers 41a on the roller guiding faces 14 and the hardened layers 41b on the large inner diameter portion 15 are separately formed while the R-portions are left unquenched. Since the R-portions do not interfere with the roller assembly, there arises no problem even if the R-portions are left unquenched. It is apparent that hardened layers 41 can also be continuously formed between the two regions as shown in FIG. 3 if the R-portions can be quenched.

Figure 4:
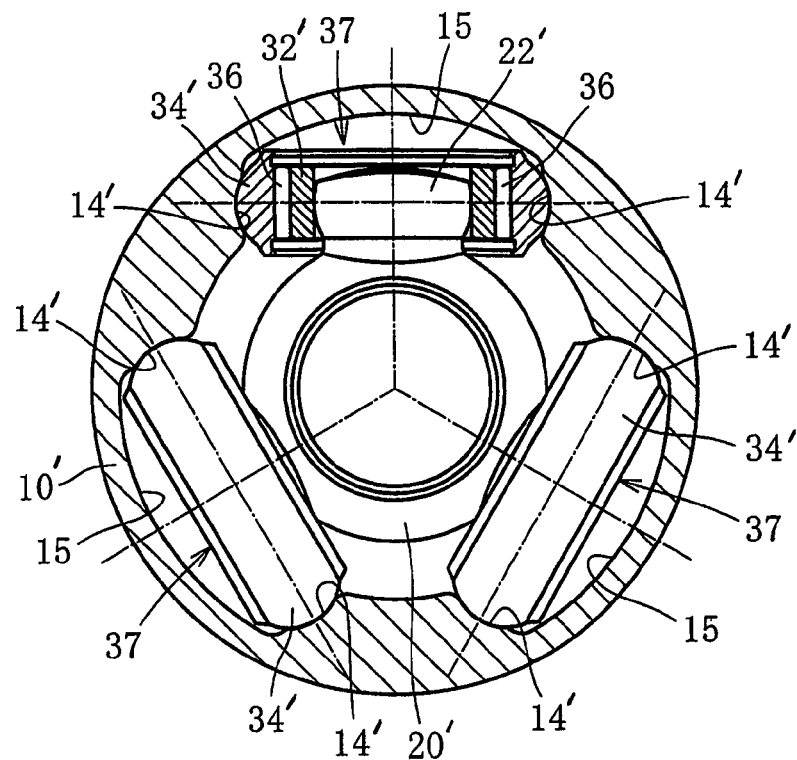
FIG. 4 is a cross-sectional view showing another example of the constant velocity universal joint.
Figure 5:
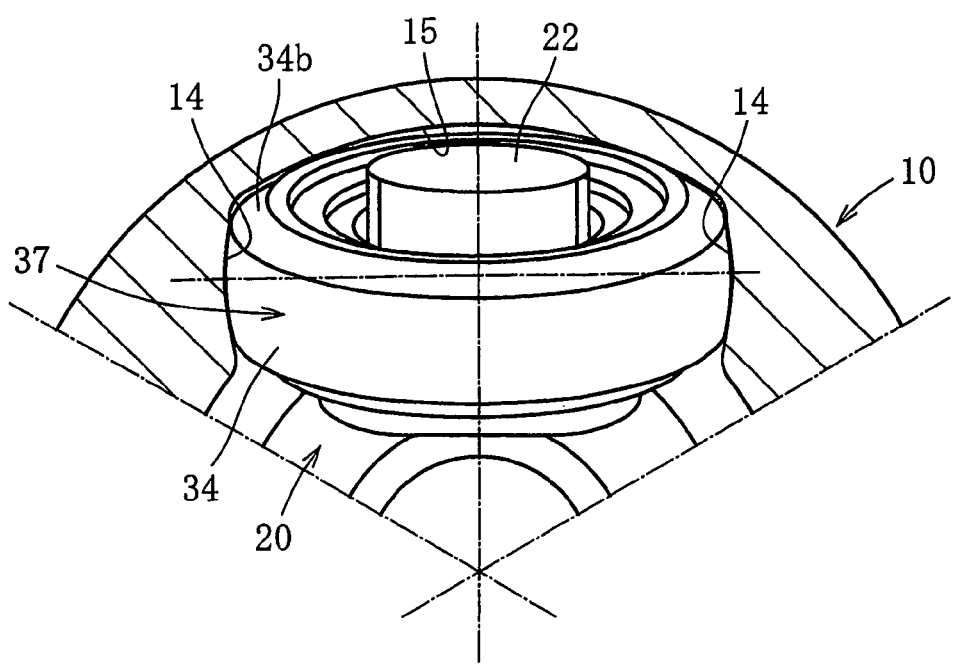
FIG. 5 is a cross-sectional view showing a constant velocity universal joint, illustrating an inclined state of a roller assembly.

The application of the present invention is not limited to the tripod type constant velocity universal joint exemplified in the above-described embodiment; the present invention can be widely applied to tripod type constant velocity universal joints, in which a roller assembly can oscillate. As another example of such a type of joint, a joint shown in FIG. 4 is also known. Hereinafter, a schematic structure of the joint will be described.

As in the embodiment shown in FIG. 1, the constant velocity universal joint shown in FIG. 4 includes: the outer joint member 10' having three track grooves 12 extending in an axial direction, formed on its inner circumferential face; and the tripod member 20' having three trunnions 22' provided so as to protrude in a radial direction. The roller guiding faces 14' are formed on lateral walls of each of the track grooves 12, which face each other in a circumferential direction. The roller 34' attached to each of the trunnions 22' of the tripod member 20' is housed within each of the track grooves 12. The outer joint member 10 is no-flange type. The cylindrical large inner diameter portion 15 is formed between the roller guiding faces 14'.

The outer circumferential face of each of the trunnions 22' of the tripod member 20' is spherical. A cylindrical inner circumferential face of the cylindrical ring 32' is slid ably fitted onto the spherical face. The ring 32' and the roller 34' form the relatively rotatable roller assembly 37 through rolling elements. The needle bearings 36 are provided between the cylindrical outer circumferential face of the ring 32' and the cylindrical inner circumferential face of the roller 34' so as to realize a so-called full complement bearing. The roller 34' is housed within the track groove 12 of the outer joint member 10 so as to be movable in the axial direction of the outer joint member 10 while rolling on the roller guiding faces 34 of the track groove 12. The outer circumferential face of the trunnion 22' is a spherical surface having a center of curvature on the axial line of the trunnion 22'. The roller assembly 37 oscillates about the center of curvature.

As in the above-described embodiment shown in FIG. 2, the hardened layers (see FIG. 2 or FIG. 3) are partially provided on the large inner diameter portion 15 of the track groove 12 in contact with the inclined roller assembly 37 in the constant velocity universal joint shown in FIG. 4 so as to prevent slide abrasion of the large inner diameter portion 15.

As described above, according to the present invention, even when the roller assembly is inclined, the hardened layers are formed on the contact portions of the large inner diameter portion of the track groove with the roller assembly. Accordingly, local abrasion of the track groove due to the contact can be reduced to improve a lifetime of the joint.

What is claimed is:

1. A constant velocity universal joint comprising:
   an outer joint member having track grooves formed at three positions on an inner circumference thereof, each of the track grooves having roller guiding faces provided so as to face each other in a circumferential direction and a large inner diameter portion provided between the roller guiding faces;
   a tripod member having three trunnions protruding in a radial direction; and
   roller assemblies attached to the respective trunnions of the tripod member, each of the roller assemblies being capable of oscillating with respect to each of the trunnions and having a roller guided in an axial direction of the outer joint member along the roller guiding faces,
   wherein hardened layers are formed on the roller guiding faces of the track groove and on both end sides of the large inner diameter portion in a circumferential direction except in the vicinity of the center of the track groove.

2. The constant velocity universal joint according to claim 1, wherein
   a value of F/D is equal to or less than 0.45, where a distance from the center of the track groove to an end of the hardened layer on the side of the center of the track groove is F and a diameter of the outer circumference of the roller assembly is D.

3. The constant velocity universal joint according to claim 1,
   wherein a value of F/D is greater than 0.15 and less than or equal to 0.45 where a distance from the center of the track groove to an end of the hardened layer on the side of the center of the track groove is F and a diameter of the outer circumference of the roller assembly is D.

4. The constant velocity universal joint according to any one of claims 1 to 3, wherein
   the roller assembly comprises: the roller; and a ring fitted onto the trunnion so as to rotatably support the roller.

5. The constant velocity universal joint according to claim 4, wherein
   an outer circumferential face of the trunnion has a straight shape on a longitudinal section thereof, is in contact with an inner circumferential face of the ring in a direction perpendicularly crossing an axial line of the joint on the cross section, and forms a gap between the inner circumferential face of the ring in an axial direction of the joint and itself.

* * * * *